US010528257B2

(12) United States Patent
Gao et al.

(10) Patent No.: US 10,528,257 B2
(45) Date of Patent: Jan. 7, 2020

(54) METHOD AND APPARATUS FOR REPRODUCING AN I/O OPERATION OF A STORAGE SYSTEM

(71) Applicant: EMC IP Holding Company LLC, Hopkinton, MA (US)

(72) Inventors: Hongpo Gao, Beijing (CN); Geng Han, Beijing (CN); Jamin Jianbin Kang, Beijing (CN); Jibing Dong, Beijing (CN); Jian Gao, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/622,751

(22) Filed: Jun. 14, 2017

(65) Prior Publication Data

US 2017/0364269 A1 Dec. 21, 2017

(30) Foreign Application Priority Data

Jun. 16, 2016 (CN) .......................... 2016 1 0429398

(51) Int. Cl.
| | |
|---|---|
| *G06F 3/06* | (2006.01) |
| *G06F 11/34* | (2006.01) |
| *G06F 12/06* | (2006.01) |
| *G06F 13/18* | (2006.01) |
| *G06F 9/46* | (2006.01) |

(52) U.S. Cl.
CPC .......... *G06F 3/0604* (2013.01); *G06F 3/0656* (2013.01); *G06F 3/0659* (2013.01); *G06F 9/46* (2013.01); *G06F 13/18* (2013.01)

(58) Field of Classification Search
CPC . G06F 9/46; G06F 13/18; G06F 17/30; G06F 3/0604
See application file for complete search history.

(56) References Cited

U.S. PATENT DOCUMENTS

| | | | |
|---|---|---|---|
| 8,671,229 B1 | 3/2014 | Taylor et al. | |
| 9,131,374 B1 | 9/2015 | Avni et al. | |
| 9,213,717 B1 | 12/2015 | Pawar et al. | |
| 9,355,112 B1 | 5/2016 | Armangau et al. | |
| 9,760,574 B1 | 9/2017 | Zhai et al. | |
| 2004/0049681 A1* | 3/2004 | Diehl ................. | H04N 7/17318 713/178 |
| 2007/0226755 A1* | 9/2007 | Kilian-Kehr ............. | G06F 8/71 719/318 |
| 2009/0037431 A1* | 2/2009 | Martino ................ | G06Q 30/02 |

(Continued)

*Primary Examiner* — Getente A Yimer
(74) *Attorney, Agent, or Firm* — BainwoodHuang

(57) ABSTRACT

A method includes in response to receiving an I/O request for the storage system, determining information associated with the I/O request; generating a timestamp associated with the I/O request; and recording the information and the timestamp to reproduce an operation associated with the I/O request. A method comprises: in response to a request for reproducing an I/O operation of the storage system, obtaining information associated with at least one I/O request for the storage system, the information being recorded in response to reception of the at least one I/O request; obtaining at least one timestamp corresponding to the at least one I/O request; and reproducing the operation of the at least one I/O request on the storage system based on the information and the at least one timestamp.

14 Claims, 9 Drawing Sheets

(56) References Cited

U.S. PATENT DOCUMENTS

| | | | |
|---|---|---|---|
| 2009/0112911 A1* | 4/2009 | Chu | G06F 17/30097 |
| 2012/0150796 A1* | 6/2012 | Martick | G06F 17/3048 |
| | | | 707/610 |
| 2014/0195699 A1* | 7/2014 | Sokol, Jr. | G06F 13/18 |
| | | | 710/40 |

* cited by examiner

US 10,528,257 B2

METHOD AND APPARATUS FOR REPRODUCING AN I/O OPERATION OF A STORAGE SYSTEM

RELATED APPLICATIONS

This application claim priority from Chinese Patent Application Number CN201610429398.X, filed on Jun. 16, 2016 at the State Intellectual Property Office, China, titled "METHOD AND DEVICE FOR REPRODUCING I/O FOR STORAGE SYSTEM" the contents of which is herein incorporated by reference in its entirety.

FIELD

Embodiments of the present disclosure generally relate to computer storage technologies, and more specifically, to a method and apparatus for reproducing an input/output (L/O) operation of a storage system.

BACKGROUND

With constant development of current large data era, a stacked storage system has been applied increasingly wider. The stacked storage system always involves multi-layered components. A multi-layer structure makes it hard to perform I/O performance analysis and adjustment to the storage system. Moreover, when the stacked storage system is specifically deployed in an application, the storage system may receive various kinds of I/O requests generated by the application. However, the performance of the stacked storage system sometimes cannot support a specific application scenario. In most cases, such specific application scenario is not allowed to be reproduced at a client. This also makes it hard to perform analysis and adjustment to the I/O performance of the stacked storage system.

SUMMARY

Generally, embodiments of the present disclosure provide a method, an apparatus, and a computer program product for reproducing an I/O operation of a storage system.

In a first aspect of the present disclosure, there is provided a method for reproducing an I/O operation of a storage system. The method comprises: in response to receiving an I/O request for the storage system, determining information associated with the I/O request; generating a timestamp associated with the I/O request; and recording the information and the timestamp to reproduce the operation associated with the I/O request.

In a second aspect of the present disclosure, there is provided a method for reproducing an I/O operation of a storage system. The method comprises: in response to a request for reproducing the I/O operation of the storage system, obtaining information associated with at least one I/O request associated with the I/O operation for the storage system, the information being recorded in response to reception of the at least one I/O request; obtaining at least one timestamp corresponding to the at least one I/O request; and reproducing an operation of the at least one I/O request on the storage system based on the information and the at least one timestamp.

In a third aspect of the present disclosure, there is provided an electronic device. The electronic device comprises: a processing unit; and a memory that stores instructions, the instructions, when being executed by the processing unit, causing the electronic device to: in response to an I/O request for a storage system, determine information associated with the I/O request; generate a timestamp associated with the I/O request; and record the information and the timestamp so as to reproduce an operation associated with the I/O request.

In a fourth aspect of the present disclosure, there is provided an electronic device. The electronic device comprises: a processing unit; and a memory that stores instructions, the instructions, when being executed by the processing unit, causing the electronic device to: in response to a request for reproducing an I/O operation of a storage system, obtain information associated with at least one I/O request associated with the I/O operation for the storage system, the information being recorded in response to reception of the at least one I/O request; obtain at least one timestamp corresponding to the at least one I/O request: and reproduce an operation of the at least one I/O request on the storage system based on the information and the at least one timestamp.

Other aspects of the present disclosure also include a computer program product. The computer program product is tangibly stored on a non-transient computer readable medium and includes machine-executable instructions which, when being executed, cause the machine to execute one or more steps of the methods above.

It will be appreciated that, the contents provided in the Summary section are not intended to limit key or important features of the embodiments of the present disclosure, and are also not intended to limit the scope of the present disclosure. Other features of the present disclosure will be made apparent by the following description.

BRIEF DESCRIPTION OF THE DRAWINGS

Through the following detailed description with reference to the accompanying drawings, the above and other features, advantages, and aspects of example embodiments of the present disclosure will become more apparent. In the drawings, same or similar reference numerals represent same or similar elements, in which.

DETAILED DESCRIPTION OF EMBODIMENTS

Figure 1:
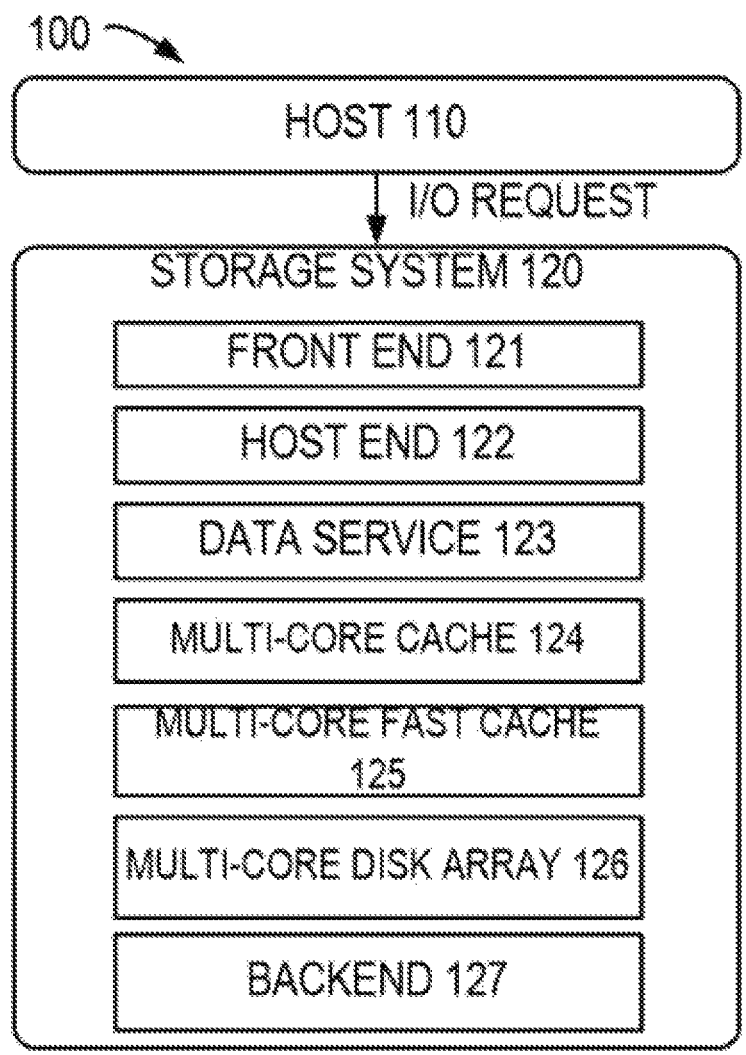
FIG. 1 is a diagram illustrating a structure of an example stacked storage system and its application scenario.

Hereinafter, embodiments of the present disclosure will be described in more detail with reference to the accompanying drawings. Although some embodiments of the present disclosure are illustrated in the drawings, it should be understood that the present disclosure may be implemented in various forms and should not be construed as being only limited to the embodiments illustrated here; on the contrary, providing of these embodiments is for understanding the present disclosure more thoroughly and comprehensively. It should be understood that the drawings and embodiments of the present disclosure are only for example purposes, not for limiting the protection scope of the present disclosure.

Herein, the term "storage system" may refer to any storage device for depositing programs and data, or may refer to a system consisting of various kinds of storage devices, control parts, and devices (hardware) and algorithms (software) managing information scheduling.

FIG. 1 is a diagram illustrating a structure of an example stacked storage system 100 and its application scenario. As illustrated in FIG. 1, a storage system 120 serves a host 110. Specifically, the host 110 may transmit an I/O request to the storage system 120 so as to store relevant data into the storage system 120 or obtain the stored relevant data from the storage system 120. A structure of the storage system 120 in FIG. 1 for example may be a VNX2 stack.

As illustrated in FIG. 1, the storage system 120 comprises multiple layers of components, e.g., a front end 121, a host end 122, a data service 123, a multicore cache 124, a multicore fast cache 125, a multicore RAID 126, and a backend 127. An I/O request issued from the host 110 to the storage system 120 has to pass through a plurality of components. Each component processes the I/O request or only passes the I/O request to a next component. In addition, the I/O request, when passing down through each component, may be combined or split.

As mentioned above, in the stacked storage system 100 shown in FIG. 1, because the structure of the storage system is complex and/or the client scene is hard to be reproduced, it is hard to perform I/O performance analysis and adjustment of the storage system. In order to solve the above and other potential problems, embodiments of the present disclosure provide a scheme of reproducing an I/O operation of a storage system so as to perform I/O performance analysis and adjustment of the storage system.

Figure 2:
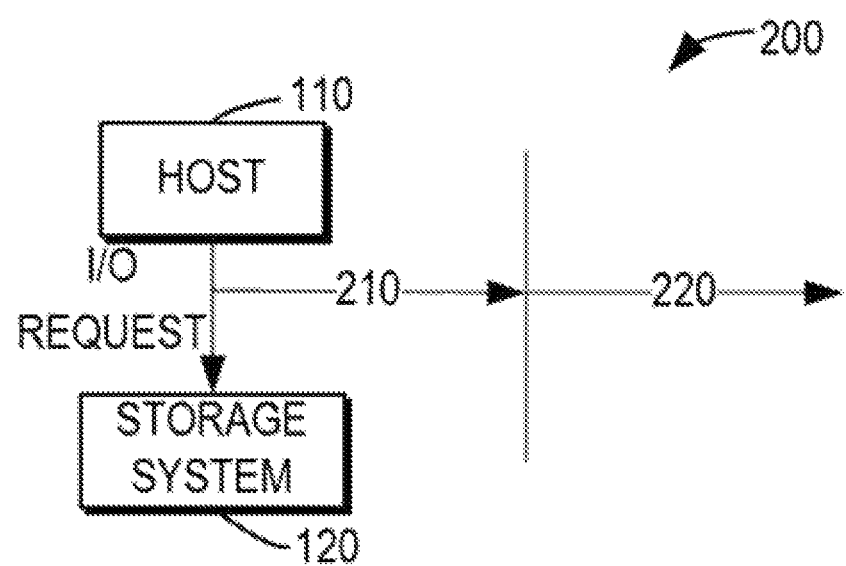
FIG. 2 is a diagram illustrating a processing procedure in an application scenario according to embodiments of the present disclosure.

FIG. 2 is a diagram illustrating a processing procedure 200 in an application scenario according to embodiments of the present disclosure. As illustrated in FIG. 2, according to the embodiments of the present disclosure, when the host 110 issues an I/O request to a storage system 120, information associated with the I/O request may be obtained (210) from the I/O request. Based on the obtained information associated with the I/O request, an operation associated with the I/O request may be reproduced (220).

For example, in some embodiments, real-time obtained information associated with the I/O request may be stored, and when it is needed to perform analysis and/or adjustment to the I/O performance, an operation associated with the I/O request will be reproduced based on the stored information. Of course, real-time reproduction also falls within the scope of the present disclosure. Alternatively or additionally, in some embodiments, information associated with the I/O request for the component may be obtained for any one or more components in the storage system, and the operation associated with the I/O request is reproduced based on the obtained information.

Hereinafter, more detailed depiction will be made with reference to FIG. 3 to FIG. 6. At the ease of depiction, embodiments of the present disclosure will be described with reference to the stacked storage system 100 of FIG. 1. However, it should be understood that the idea and principle of the present disclosure is also suitable for other stacked storage systems, regardless of whether they are currently known or future developed.

Figure 3:
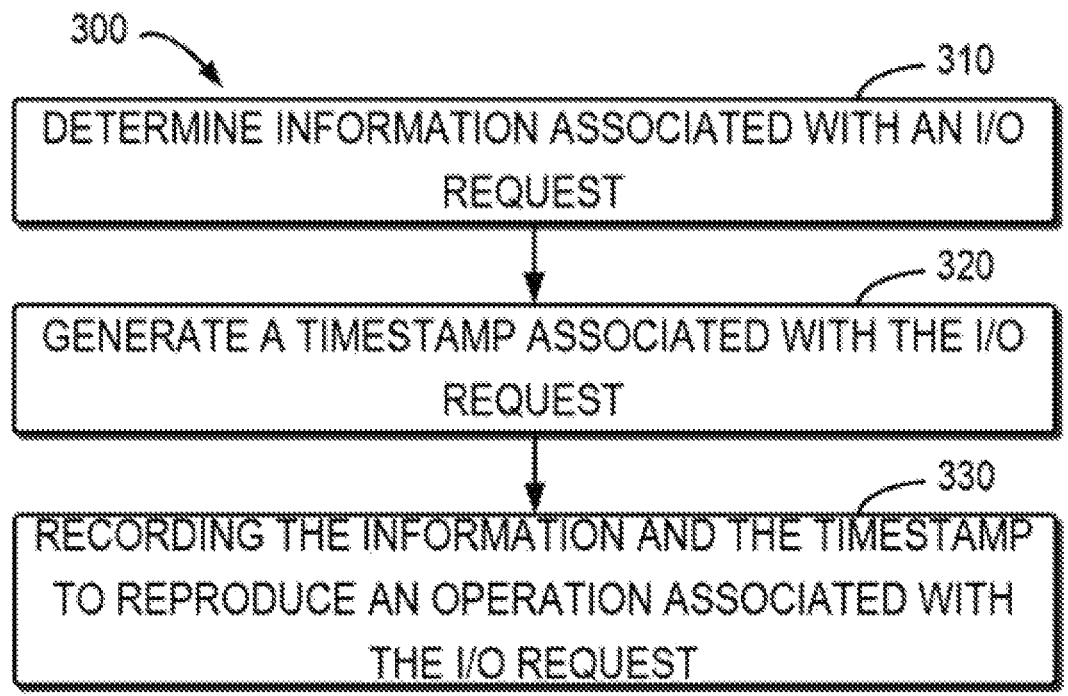
FIG. 3 is a diagram illustrating a method of reproducing an I/O operation of a storage system according to one aspect of embodiments of the present disclosure.

FIG. 3 illustrates a flow diagram of a method 300 for reproducing an I/O operation of a storage system according to one aspect of the embodiments of the present disclosure. The method 300 may be applied to implement processing shown in 210 of FIG. 2. The method 300 may be implemented on the storage system 120. In particularity, the method 300 may be implemented on any one or more of the components 121-127 of the storage system. Additionally or alternatively, the method 300 may also be implemented on a host 110 corresponding to the storage system.

As illustrated in FIG. 3, at 310, information associated with an I/O request is determined. Specifically, the information associated with the I/O request may be determined in response to receiving an I/O request for a storage system. In one embodiment, the information associated with the I/O request may be obtained in response to a signal for enabling an I/O monitoring. For example, the signal for enabling an I/O monitoring may be a switching signal to switch on or off I/O monitoring. In such an embodiment, if the signal I/O for enabling an I/O monitoring indicating switching on of the I/O monitoring is received, the I/O request for the storage system starts to be monitored. If an I/O request for the storage system is monitored, information associated with the I/O request will be determined.

According to the embodiments of the present disclosure, the information includes at least one of the following associated with the I/O request: information about an operation type of the I/O request, information about an operation scope of the I/O request, information about start or end of the I/O request, and information about a source of the I/O request. Specifically, the operation type may indicate an operation kind of the I/O, e.g., reading, writing, zeroing operation, etc. In one embodiment, the operation type may include Opcode, for example, may be indicated by the Opcode. The operation scope may indicate a storage area for the I/O. In one embodiment, the operation scope may include a logical block address (LBA), e.g., may be indicated by the LBA. For example, the operation scope may include the LBA where the sector for the I/O starts and the number of blocks involved in the I/O. The start information may indicate information associated with start and end of the I/O. In one embodiment, the start information may include at least one of the following: start time, end time, and start identifier. The source may indicate to which component of the storage system the I/O is directed, which CPU core is involved, etc. In one embodiment, the source may include at least one of the following items: a component identifier of the storage system, and a CPU identifier.

It should be understood that the information associated with the I/O request is not limited to the specific examples listed above, but may also include any other appropriate information. For example, it may also comprise a data portion, e.g., "XOR" operational data of the block, for verifying data correctness.

At 320, a timestamp associated with the I/O request is generated. Specifically, a timestamp is generated to indicate the time of obtaining or recording the information for the I/O request. The timestamp may be stored in any appropriate format. Scope of the present disclosure is not limited in this aspect.

At 330, the information and the timestamp are recorded, for reproducing an operation associated with the I/O request. In one embodiment, the information and the timestamp may be recorded by defining a corresponding profile. As an instance, Table 1 below shows an example of some fields of the profile. It should be noted that the example shown in Table 1 is only for the purpose of discussion, not intended to limit the scope of the present disclosure in any manner.

TABLE 1

| Field | Comments |
| --- | --- |
| Origin | Define where the I/O comes from |
| Timestamp | Record the time of the I/O |
| Opcode | The operation type of the I/O, such as Read/Write/Zero . . . |
| LBA | The LBA where the sector for the I/O starts |
| Blocks | The number of blocks involved in the I/O |
| CPU_ID | The CPU id when origin processing this I/O |
| Start/End | The I/O is start or end |
| DATA XOR | store the data to verify I/O content |

Figure 4:
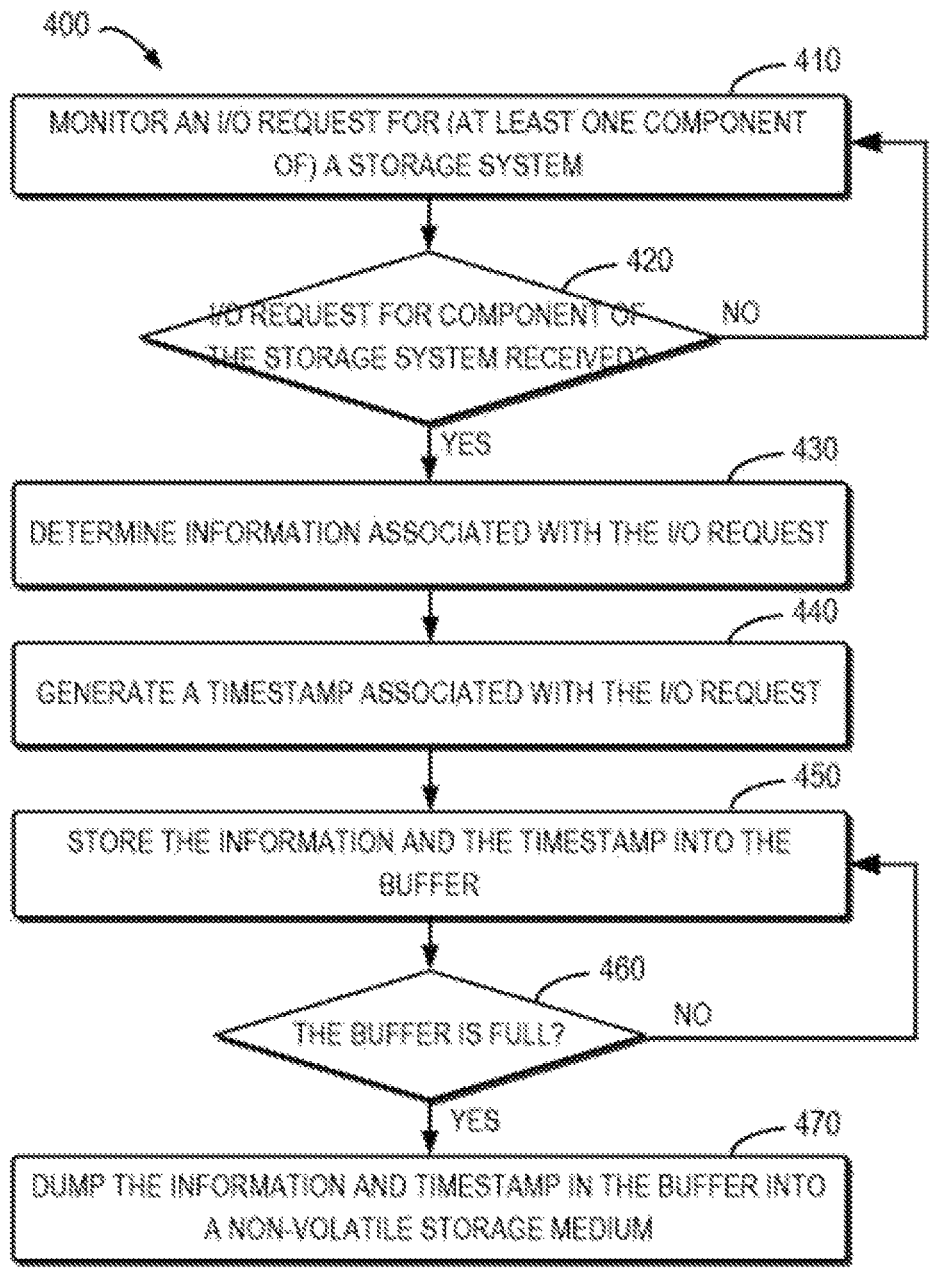
FIG. 4 is a flow diagram of a method of reproducing an I/O operation of a storage system according to an embodiment of the aspect.

FIG. 4 is a flow diagram of a method 400 of reproducing an I/O operation of a storage system according to an embodiment of the aspect. In this example, the method 400 is executed for at least one component of the storage system. The method 400 is likewise applicable to implement the processing shown in 210 of FIG. 2. The method 400 may be implemented on any one or more components 121-127 of the storage system. Additionally or alternatively, the method 400 may also be implemented on the host 100 corresponding to the storage system. It should be understood that the method 400 may be regarded as a specific implementation of the method 300.

As illustrated in FIG. 4, at 410, an I/O request for at least one component of a storage system is monitored. In one embodiment, an I/O request for the component of the storage system may be started to be monitored in response to a signal for enabling an I/O monitoring for at least one component of the storage system.

At 420, it is determined whether the I/O request of the component of the storage system has been received. If the I/O request is not received, the method 400 returns to step 410 so as to continue monitoring the I/O request. If the I/O request is received, the method 400 enters into step 430 to determine information associated with the I/O request. The step 430 corresponds to the step 310 depicted above with reference to FIG. 3, which will not be detailed here.

At 440, a timestamp associated with the I/O request is generated. Processing of the step is similar to processing of step 320 depicted above with reference to FIG. 3, which will not be detailed here. Then, at 450, the information determined at 430 and the timestamp generated at 440 are stored in a buffer. Specifically, the information and timestamp may be recorded in the buffer in a manner of profiles depicted above with reference to step 330 of FIG. 3. By only recording the I/O profiles in the buffer, the performance of the I/O real-time path basically will not be affected.

In some embodiments, it may be determined at 460 whether the buffer is full. If the buffer is not full (branch "No"), the subsequent data may be stored in the buffer. On the other hand, if it is determined at 460 that the buffer is full (branch "yes"), the method 400 may proceed to step 470.

At 470, the information and timestamp in the buffer is dumped into a non-volatile storage medium. In one embodiment, the buffer may be a ring buffer zone. Specifically, the ring buffer may be partitioned into a plurality of smaller ring buffer zones. If a small annular buffer zone is full, the data buffered in the ring buffer zone may be dumped into the non-volatile storage medium through another backstage thread. If the thread is slower than a speed of generating information records, the records will be lost. Therefore, in one example embodiment, a relatively fast non-volatile storage medium may be selected. The non-volatile storage medium, for example, is a permanent storage disk, such as a magnetic disk or an optical disk. In another example embodiment, if too many information records exist, a larger buffer zone may be allocated thereto.

The procedure of obtaining information associated with the I/O request has been described above with reference to FIG. 3 and FIG. 4, i.e., action 210 in FIG. 2. Hereinafter, the procedure of reproducing an operation associated with the I/O request based on the information in conjunction with FIGS. 5 and 6, i.e., action 220 in FIG. 2.

Figure 5:
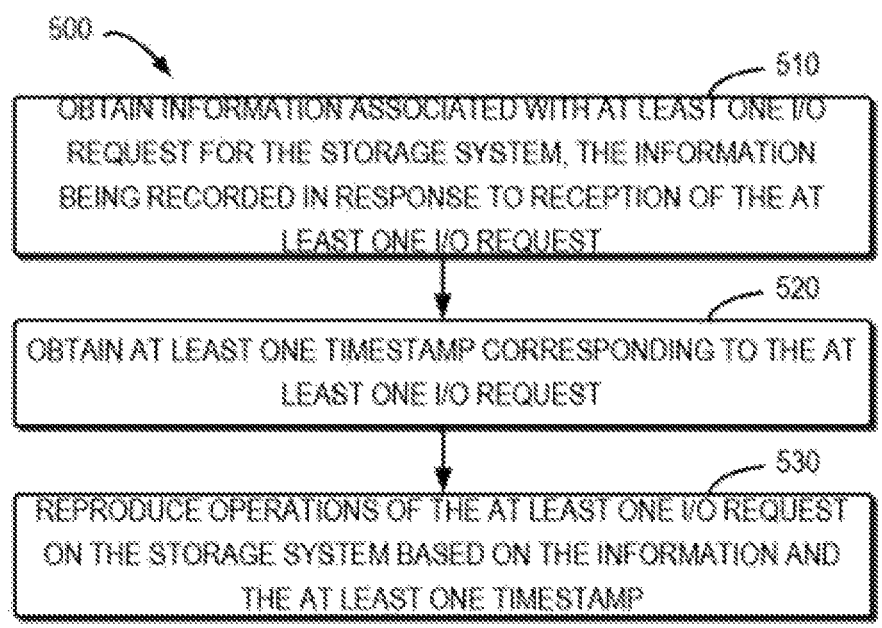
FIG. 5 is a flow diagram of a method of reproducing an I/O operation of a storage system according to another aspect of embodiments of the present disclosure.

FIG. 5 is a flow diagram of a method 500 of reproducing an I/O operation of a storage system according to another aspect of embodiments of the present disclosure. The method 500 may be used to implement the processing shown in 220 of FIG. 2. The method 500 may be implemented on a storage system 120. Particularly, the method 500 may be implemented on any one or more components 121-127 of the storage system. Additionally or alternatively, the method 500 may also be implemented on the host 110 corresponding to the storage system. Additionally or alternatively, in some other embodiments, the method 500 may also be implemented on any other computing device than the host 110 and the storage system 120.

As illustrated in FIG. 5, at 510, information associated with at least one I/O request for the storage system is obtained. Specifically, in response to a request for reproducing an I/O operation of the storage system, information associated with the at least one I/O request may be obtained. The information is recorded in response to reception of the at least one I/O request, as previously described with reference to FIG. 3 and FIG. 4. For example, such information may be obtained by accessing the profile that stores in the information (referring to relevant content depicted above with reference to FIG. 4). In some embodiments, in response to a request for reproducing an I/O operation of at least one component of the storage system, information associated with at least one I/O request for the at least one component of the storage system may be obtained. In other words, analysis and adjustment of the I/O performance may be performed only for a specific component of the storage system, thereby increasing an operation flexibility of the I/O performance analysis.

At 520, at least one timestamp corresponding to the at least one I/O request is obtained. As mentioned above, the timestamp is generated when recording the information in response to reception of the at least one I/O request, as depicted above with reference to FIGS. 3 and 4. For example, a corresponding timestamp may be obtained by accessing a profile that stores the timestamp (referring to relevant content depicted above with reference to FIG. 4).

At 530, an operation of the at least one I/O request on the storage system is reproduced based on the obtained information and at least one timestamp. To this end, in one embodiment, sorting may be performed to information associated with I/O requests according to timestamps, a script is generated according to the sorted information, and operation of the I/O requests on the storage system is reproduced by executing the script. It should be noted that, reproducing based on sorting of the I/O requests is only example. In alternative embodiments, it is also feasible to concurrently reproduce the I/O requests on different machines.

Figure 6:
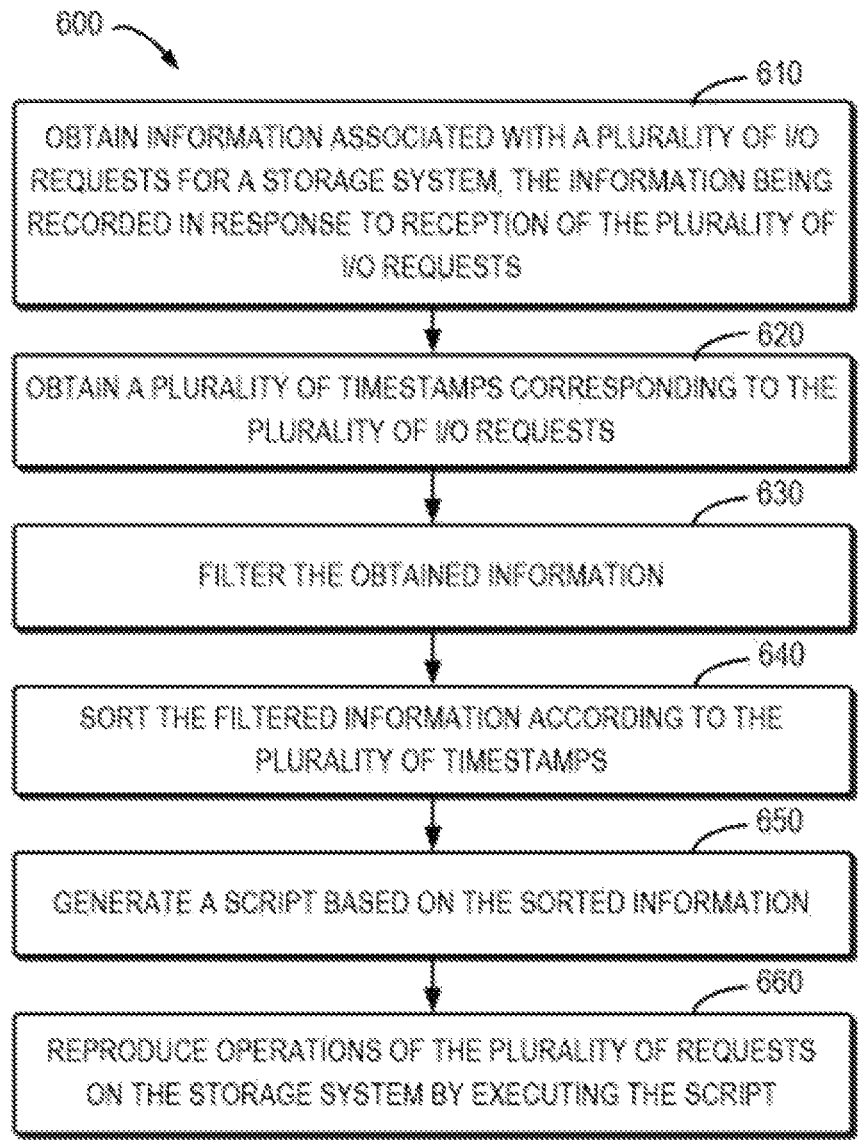
FIG. 6 is a flow diagram of a method of reproducing an I/O operation of a storage system according to an embodiment of the aspect.

Hereinafter, an embodiment of reproducing based on sorting of the I/O requests will be described in detail with reference to FIG. 6. FIG. 6 is a flow diagram of a method 600 of reproducing an I/O operation of a storage system according to an embodiment of the aspect. In this embodiment, at least one I/O request may include a plurality of I/O requests, and at least one timestamp may include a plurality of timestamps.

As illustrated in FIG. 6, at 610, in response to a request for reproducing an L/O operation of the storage system, information associated with a plurality of I/O requests for the storage system is obtained. The information is recorded in response to reception of the plurality of I/O requests. Step 610 is similar to step 510 depicted above with reference to FIG. 5, which will not be detailed here. At 620, a plurality of timestamps corresponding to the plurality of I/O requests are obtained. The timestamps are generated when recording the information in response to reception of the plurality of I/O requests. Step 620 is similar to step 520 depicted above with reference to FIG. 5, which will not be detailed here.

At 630, the obtained information is filtered. It should be understood that the step is optional, but is not essential. According to the embodiment, the obtained information may be filtered as needed. For example, if it is only required to analyze the I/O performance of a specific component, the source information (e.g., identifier of the specific component in this example) of the I/O may be used as a filtering condition. In this way, information associated with a plurality of I/O requests only corresponding to the identifier of the specific component can be derived. It should be understood that the filtering condition may be arbitrarily set as needed, without being limited to the examples disclosed here.

At 640, the filtered information is sorted according to a plurality of timestamps. For example, the information associated with each I/O request may correspond to one record in the profile, and each record corresponds to one timestamp. Respective records associated with respective I/O requests may be sorted according to the timestamp.

At 650, a script is generated according to the sorted information. In some embodiments, for example, corresponding operation commands or a set of commands (e.g., executing a reading operation at certain time, for a certain LBA range, and on a certain CPU core) may be generated according to the sorted information in respective records, e.g., the I/O operation type, operation range, start information and the like, as mentioned above, and then these commands or the set of commands are written into a script.

At 660, operations of a plurality of I/O requests on the storage system are reproduced by executing the script. The script may be executed by any computing device, thereby reproducing operation procedures of these I/O requests on the storage system. In this way, analysis and adjustment of the I/O performance may be performed conveniently.

So far, a method of reproducing an I/O operation of a storage system according to the embodiments of the present disclosure will be described with reference to FIGS. 3-6. Correspondingly, the embodiments of the present disclosure further provide an apparatus for reproducing an I/O operation of a storage system. Hereinafter, depictions will be made with reference to FIGS. 7 and 8, respectively.

Figure 7:
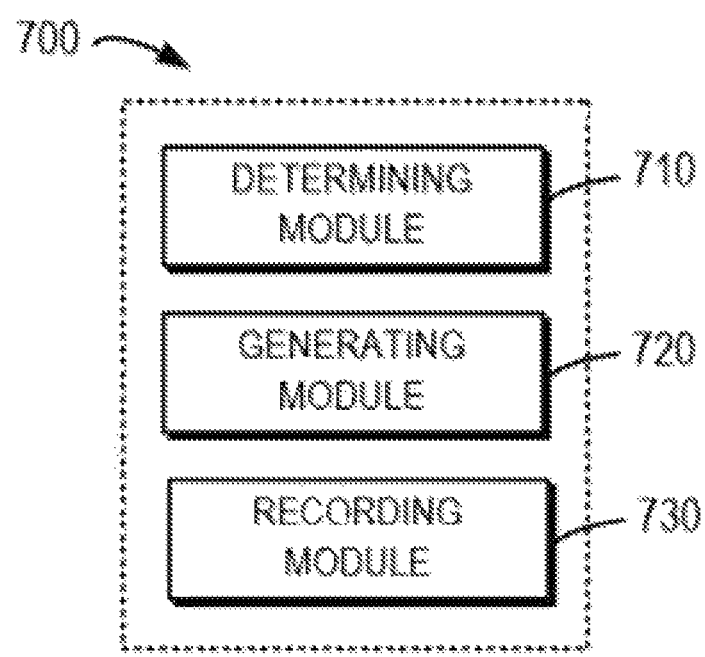
FIG. 7 is a schematic structural diagram of an apparatus for reproducing an I/O operation of a storage system according to one aspect of embodiments of the present disclosure.

FIG. 7 illustrates a schematic structural block diagram of an apparatus 700 for reproducing an I/O operation of a storage system according to one aspect of the embodiments of the present disclosure. The apparatus 700 may be implemented on a storage system (e.g., a storage system 120 of FIG. 1). Additionally or alternatively, the apparatus 700 may be implemented on any one or more components (e.g., components 121-127 of FIG. 1) of the storage system. Additionally or alternatively, the apparatus 700 may also be implemented on a host (e.g., host 110 of FIG. 1) corresponding to the storage system.

As illustrated in FIG. 7, the apparatus 700 may comprise a determining module 710, a generating module 720, and a recording module 730. Specifically, the determining module 710 may be configured to determine information associated with the I/O request in response to reception of an I/O request for a storage system. In one embodiment, the determining module 710 may be further configured to determine information associated with the I/O request for the at least one component in response to reception of an I/O request for at least one component of the storage system. In one embodiment, the determining module 710 may be further configured to obtain information associated with the I/O request in response to a signal for enabling an I/O monitoring. The generating module 720 may be configured to generate a timestamp associated with an I/O request. The recording module 730 may be configured to record the information and timestamp so as to reproduce an operation associated with the I/O request. In one embodiment, the recording module 730 may be further configured to store the information and timestamp into a buffer. In response to the buffer becoming full, the recording module 730 may be further configured to dump the information and timestamp into a non-volatile storage medium.

Figure 8:
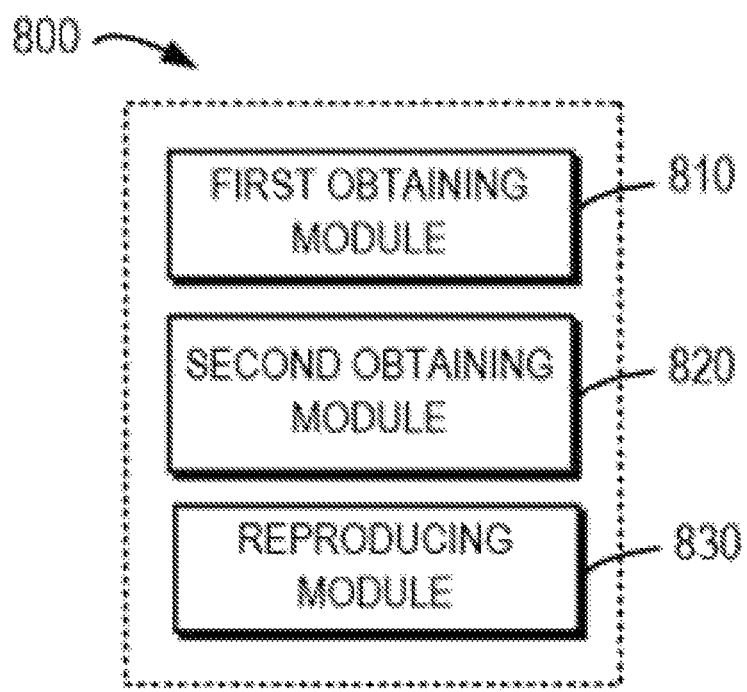
FIG. 8 is a schematic structural block diagram of an apparatus for reproducing an I/O operation of a storage system according to another aspect of embodiments of the present disclosure.

FIG. 8 illustrates a schematic structural block diagram of an apparatus 800 for reproducing an I/O operation of a storage system according to another aspect of the embodiments of the present disclosure. The apparatus 800 may be implemented on a storage system (e.g., a storage system 120 of FIG. 1). Additionally or alternatively, the apparatus 800 may be implemented on any one or more components (e.g., components 121-127 of FIG. 1) of the storage system. Additionally or alternatively, the apparatus 800 may be implemented on a host corresponding to the storage system. Additionally or alternatively, the apparatus 800 may be implemented on other computing device (e.g., any computing device other than the host 110 and the storage system 120 of FIG. 1) independent of the storage system.

As shown in FIG. 8, the apparatus 800 may comprise a first obtaining module 810, a second obtaining module 820, and a reproducing module 830. Specifically, the first obtaining module 810 may be configured to obtain information associated with at least one I/O request for a storage system in response to a request for reproducing an I/O operation of the storage system. The information is recorded in response to reception of the at least one I/O request. In one embodiment, the first obtaining module 810 may be further configured to obtain the information associated with at least one I/O request for at least one component of the storage system in response to a request for reproducing an I/O operation of the at least one component of the storage system.

The second obtaining module 820 may be configured to obtain at least one timestamp corresponding to the at least one I/O request. The timestamp is generated when recording the information in response to reception of the at least one I/O request.

The reproducing module 830 may be configured to reproduce an operation of the at least one I/O request on the storage system based on the information and at least one timestamp. In one embodiment, the at least one I/O request includes a plurality of I/O requests and the at least one timestamp includes a plurality of timestamps. In the present embodiment, the reproducing module 830 may further comprise (not shown in the figure) a sorting sub-module, a generating sub-module, and a reproducing sub-module. The sorting sub-module may be configured to sort the information of the plurality of I/O requests according to the plurality of timestamps. The generating sub-module may be configured to generate a script according to the sorted information. The re-producing sub-module may be configured to reproduce operations of the plurality of I/O requests on the storage system by executing the script. In one embodiment, the sorting sub-module may be further configured to filter the obtained information and sort the filtered information according to the plurality of timestamps.

It should be understood that each module recited in apparatus 700 and apparatus 800 corresponds to each step in methods 300 and 500 described with reference to FIGS. 3-5, respectively. Moreover, the apparatus 700 and the apparatus 800, as well as the operations and features of the module comprised therein, correspond to the operations and features described with reference to FIGS. 3-6 above, and achieve the same effect. Specific details will not be repeated.

The modules included in the apparatus 700 and apparatus 800 may be implemented in various manners, including software, hardware, firmware or any combination thereof. In one embodiment, one or more modules may be implemented using software and/or firmware, e.g., machine-executable instructions stored on the storage medium. In addition to or as alternative to the machine-executable instructions, part or all of the modules in the apparatus 700 and the apparatus 800 may be at least partially implemented by one or more hardware logic components. Exemplarily rather than limiting, feasible model-type hardware logic components include a field programmable gate array (FPGA), an application-specific integrated circuit (ASIC), an application specific standard product (ASSP), a system on chip (SOC), a complex programmable logic device (CPLD), etc.

These modules shown in FIGS. 7 and 8 may be partially or completely implemented as hardware modules, software modules, firmware modules or any combinations thereof. Particularly, in some embodiments, the flows, methods or procedures depicted above may be implemented by a storage system or a host corresponding to the storage system or hardware in other computing devices independent of the storage system.

Figure 9:
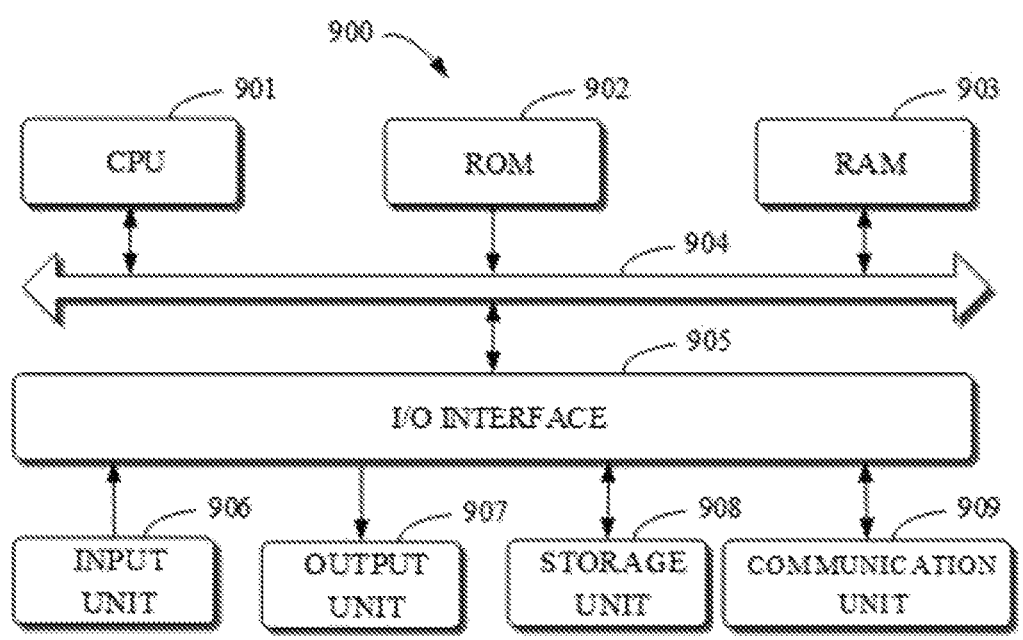
FIG. 9 is a schematic structural block diagram of an electronic device according to embodiments of the present disclosure.

FIG. 9 is a schematic structural block diagram of an electronic device 900 according to embodiments of the present disclosure. As illustrated in the figure, the apparatus 900 comprises a central processing unit (CPU) 901 which may perform various kinds of appropriate actions and processing according to computer program instructions stored in a read-only memory (ROM) 902 or computer program instructions loaded into the random access memory (RAM) 903 from the storage unit 908. In RAM 903, there may also store various kinds of programs and data needed for operations of the device 900. CPU 901, ROM 902, and RAM 903 are connected with each other via a bus 904. An I/O interface 905 may also be connected to the bus 904.

A plurality of components in the device 900 are connected to the I/O interface 905, comprising: an input unit 906, e.g., a keyboard, a mouse, etc.; an output unit 907, e.g., various kinds of displays, loudspeakers, etc.; a storage unit 908, e.g., a magnetic disk, an optic disk, etc.; and a communication unit 909, e.g., a network card, a modem, a wireless communication transceiver, etc. The communication unit 909 allows the electronic device 900 to exchange information/data with other device through a computer network such as Internet and/or various kinds of telecommunication networks.

Various procedures and processes described above, e.g., methods 300-600, may be executed by a central processing unit 901. For example, in some embodiments, the methods 300-600 may be implemented as computer software program which is tangibly embodied in a machine readable medium, e.g., a storage unit 908. In some embodiments, part or all of the computer program may be loaded and/or mounted onto the device 900 via ROM 902 and/or a communication unit 909. When the computer program is loaded to the RAM 903 and executed by the CPU 901, one or more steps in example methods 300-600 described above may be executed.

Generally, various example embodiments of the present disclosure may be implemented in hardware or specific circuits, software, logic, or any combination thereof. Some aspects may be implemented in hardware, while other aspects may be implemented in firmware or software that may be executed by a controller, a microprocessor or other computing device. When various aspects of the embodiments of the present disclosure are illustrated or described as block diagrams, flow diagrams or represented by some other diagrams, it should be understood that the blocks, apparatuses, systems, technologies or methods described here may be implemented as non-limitative examples on hardware, software, firmware, specific circuit or logic, general hardware or controller or other computing device or some combinations thereof.

As an example, embodiments of the present disclosure may be described in a context of the machine-executable instructions which are embodied in a program module executed in a device on a real or virtual processor of a target. Generally, the program modules include routines, programs, library, objects, classes, components, data structure, etc., which execute a specific task or implement a specific abstract data structure. In various embodiments, functions of the program modules may be merged or split between the described program modules. The machine-executable instructions for program modules may be executed locally or in distributed devices. In the distributed devices, the program modules may be located in both of local and remote storage mediums.

The computer program codes for implementing the methods of the present disclosure may be compiled using one or more programming languages. These computer program codes may be provided to a processor of a general computer, a specific computer, or other programmable data processing device, such that the program codes, when being executed by the computer or other programmable data processing devices, cause the functionsioperations prescribed in the flow diagrams and/or block diagrams to be executed. The program codes may be executed completely on the computer, partially on the computer, as an independent software package, partially on the computer while partially on the remote computer, or completely on a remote computer or server.

In the context of the present disclosure, the machine readable mediums may be any tangible mediums including or storing programs for or about an instruction execution system, apparatus or device. The machine readable mediums may be machine readable signal mediums or machine readable storage mediums. The machine readable storage mediums may include, but not limited to, electronic, magnetic, optical, electromagnetic, infrared or semiconductor systems, apparatuses or devices, or any appropriate combination thereof. More detailed examples of the machine readable storage mediums include electric connection with one or more wires, a portable computer disk, a hard disk, a random access memory (RAM), a read-only memory (ROM), an erasable programmable read-only memory (EPROM or flash memory), an optical storage device, a magnetic storage device, or any appropriate combination thereof.

In addition, although the operations are depicted in a specific order, it should not be understood as requiring such kind of operations be complemented in a specific order as shown or in succession, or all of the illustrated operations be executed to obtain a desired result. In some cases, multi-task or parallel will be beneficial. Likewise, although the discussion includes some specific implementation details, it should not be interpreted as limiting the scope of any invention or claims, but should be interpreted as depiction of specific embodiments for specific inventions. Some features described in the context of separate embodiments in the specification may be consolidated to be implemented in a single embodiment. In turn, various features described in a context of a single embodiment may be separately implemented in a plurality of embodiments or in any appropriate sub-combination. Although the subject matter has been described in language specific to structural features and/or method actions, it should be understood that the subject matter limited in the appended claims is not limited to the specific features or actions as depicted above. On the contrary, the specific features and actions described above are disclosed in an example form of implementing the claims.

What is claimed is:

1. A method of reproducing an input/output (I/O) operation of a storage system, comprising:
   in response to receiving an I/O request for the storage system, obtaining information from the I/O request, the I/O request having an I/O operation associated therewith, the information pertaining to one or more of the I/O operation and the I/O request;
   generating a timestamp associated with the I/O request; and
   recording the information and the timestamp to reproduce the I/O operation of the I/O request in one or more of an I/O performance analysis and adjustment of the storage system,
   wherein the information obtained from the I/O request comprises at least one of the following: information about a type of the I/O operation, information about a scope of the I/O operation, information about a start time or an end time of the of the I/O request, and information about a source of the I/O request.

2. The method according to claim 1, wherein the obtaining information from the I/O request comprises:
   obtaining the information from the I/O request in response to a signal for enabling an I/O monitoring function.

3. The method according to claim 1, wherein the recording the information and the timestamp comprises:
   storing the information and the timestamp into a buffer.

4. The method according to claim 3, further comprising:
   in response to the buffer becoming full, dumping the information and the timestamp into a non-volatile storage medium.

5. The method according to claim 1, wherein the I/O request is for at least one component of the storage system, and wherein the obtaining information from the I/O request comprises:
   in response to reception of the I/O request for the at least one component of the storage system, obtaining the information from the I/O request for the at least one component.

6. A method of reproducing an input/output (I/O) operation of a storage system, comprising:
   in response to a request for reproducing the I/O operation of the storage system, obtaining information from at least one I/O request, the at least one I/O request having the I/O operation for the storage system associated therewith, the information pertaining to one or more of the I/O operation and the at least one I/O request, the information being recorded in response to reception of the at least one I/O request;
   obtaining at least one timestamp corresponding to the at least one I/O request; and
   reproducing the I/O operation of the at least one I/O request on the storage system in one or more of an I/O performance analysis and adjustment of
   the storage system, the reproducing the I/O operation of the at least one I/O request being based on the information and the at least one timestamp,
   wherein the information obtained from the at least one I/O request comprises at least one of the following: information about a type of the I/O operation, information about a scope of the I/O operation, information about a start time or an end time of the at least one I/O request, and information about a source of the at least one I/O request.

7. The method according to claim 6, wherein the at least one I/O request includes a plurality of I/O requests and the at least one timestamp includes a plurality of timestamps, and wherein the reproducing the I/O operation of the at least one I/O request on the storage system comprises:
   sorting the information of the plurality of I/O requests according to the plurality of timestamps;
   generating a script according to the sorted information; and
   reproducing I/O operations of the plurality of I/O requests on the storage system by executing the script.

8. The method according to claim 7, wherein the sorting the information of the plurality of I/O requests according to the plurality of timestamps comprises:
   filtering the obtained information; and
   sorting the filtered information according to the plurality of timestamps.

9. The method according to claim 6, wherein the request for reproducing the I/O operation of the storage system is for reproducing the I/O operation of at least one component of the storage system, and wherein the obtaining information from the at least one I/O request comprises:
   in response to the request for reproducing the I/O operation of the at least one component of the storage system, obtaining the information from the at least one I/O request for the at least one component of the storage system.

10. An electronic device, comprising:
a processing unit; and
a memory that stores instructions which, when being executed by the processing unit, cause the electronic device to:
   in response to receiving an I/O request for a storage system, obtain information from the I/O request, the I/O request having an I/O operation associated therewith, the information pertaining to one or more of the I/O operation and the I/O request;
   generate a timestamp associated with the I/O request; and
   record the information and the timestamp to reproduce the I/O operation of the I/O request in one or more of an I/O performance analysis and adjustment of the storage system,
   wherein the information obtained from the I/O request comprises at least one of the following: information about a type of the I/O operation, information about a scope of the I/O operation, information about a start time or an end time of the I/O request, and information about a source of the I/O request.

11. The electronic device according to claim 10, wherein the memory further stores instructions which, when being executed by the processing unit, cause the electronic device to:
   obtain the information from the I/O request in response to a signal for enabling an I/O monitoring function.

12. The electronic device according to claim 10, wherein the memory further stores instructions which, when being executed by the processing unit, cause the electronic device to:
   store the information and the timestamp into a buffer.

13. The electronic device according to claim 12, wherein the memory further stores instructions which, when being executed by the processing unit, cause the electronic device to:
   in response to the buffer becoming full, dump the information and timestamp into a non-volatile storage medium.

14. The electronic device according to claim 10, wherein the I/O request is for at least one component of the storage system, and wherein the memory further stores instructions which, when being executed by the processing unit, cause the electronic device to:
   in response to reception of the I/O request for the at least one component of the storage system, obtain the information from the I/O request for the at least one component.

* * * * *